(12) United States Patent
    Ranganathan

(10) Patent No.: US 8,350,858 B1
(45) Date of Patent: Jan. 8, 2013

(54) DEFINING TIME FOR ANIMATED OBJECTS

(75) Inventor: Sreedhar Ranganathan, Tamil Nadu (IN)

(73) Assignee: Adobe Systems Incorporated, San Jose, CA (US)

( * ) Notice: Subject to any disclaimer, the term of this patent is extended or adjusted under 35 U.S.C. 154(b) by 873 days.

(21) Appl. No.: 12/474,971

(22) Filed: May 29, 2009

(51) Int. Cl.
    *G06T 13/00* (2011.01)
    *G09G 5/00* (2006.01)
    *G06F 3/00* (2006.01)

(52) U.S. Cl. ........ 345/473; 345/474; 345/617; 345/619; 715/716; 715/719; 715/723

(58) Field of Classification Search .................. None
See application file for complete search history.

(56) References Cited

U.S. PATENT DOCUMENTS

| | | | |
|---|---|---|---|
| 5,838,938 A * | 11/1998 | Morgan | ................ 715/723 |
| 6,198,469 B1 | 3/2001 | Tjandrasuwita | |
| 6,392,651 B1 | 5/2002 | Stradley | |
| 2001/0043177 A1 | 11/2001 | Huston et al. | |
| 2009/0074304 A1 * | 3/2009 | Momosaki | ................ 382/224 |
| 2009/0102858 A1 * | 4/2009 | Eggers et al. | ................ 345/617 |

* cited by examiner

*Primary Examiner* — Tize Ma
(74) *Attorney, Agent, or Firm* — Robert C. Kowert; Meyertons, Hood, Kivlin, Kowert & Goetzel, P.C.

(57) ABSTRACT

Systems and methods for synchronizing the playing of animation objects are presented. An animation object map may assign an animation object to each region of multiple regions of a viewing area. A synchronization shading map may assign a shade to each of the regions, where at least two of the shades assigned to regions differ in intensity. Playing each animation object may involve determining a start time for each of the regions. The start time for each particular region depends upon an intensity of a shade assigned to the particular region by the synchronization shading map, and ones of the regions having different shades differ in their respective start times based on a difference in intensities of shades assigned to those regions by the synchronization shading map. Playing of the animation object within a region begins at the start time determined for the region according to the synchronization map.

25 Claims, 19 Drawing Sheets

DEFINING TIME FOR ANIMATED OBJECTS

BACKGROUND

Description of the Related Art

In the early days of animation, each frame in a video sequence was drawn by hand. To create the illusion of motion, the hand-drawn images were projected onto a screen in sequential order, rapidly enough to give the appearance that the elements in the individual frames were moving smoothly. Since those days, the graphic arts have evolved to include specialized computer software and hardware designed to produce video animation sequences.

One current conventional technique for producing video animation employs a timeline to define the exact times at which various images are set to appear, and the period of time for which they are to be shown. The manual placement of large numbers of video animation objects along such timelines can be laborious and time-consuming.

Another conventional method employs the manipulation of mathematical curves to control video animation sequences, requiring slope adjustments to accelerate or decelerate the speed of an animated object. This method can be non-intuitive and indirect.

Presets (ready-made animations) are also currently in use, but they tend to be inflexible, and to restrict the artist to a small number of pre-defined animated sequences over which the artist has limited control.

SUMMARY

Various embodiments of systems and methods for synchronizing the playing of animation objects in several regions of a viewing area are disclosed. In one embodiment, a method may include a computer receiving an animation object map. The animation object map may assign an animation object to each region in a collection of regions of a viewing area. The method may further include receiving a synchronization shading map that assigns a shade to each region in the collection of regions of the viewing area. At least two of the shades assigned to regions in the collection of regions differ in intensity. The method may entail the computer playing, within each region of the collection of regions, the animation object assigned to the region by the animation object map. The playing may involve determining a start time for each of the regions in the collection of regions. The start time for each particular region depends upon an intensity of a shade assigned to the particular region by the synchronization shading map. Ones of the collection of regions having different shades differ in their respective start times based on a difference in intensities of shades assigned to those regions by the synchronization shading map. The playing may also encompass, for each region of the collection of regions, starting playing within the region the animation object that is assigned to the region by the animation object map, so that the playing of the animation object within the region begins at the start time determined for the region.

In one embodiment, a memory is coupled to a processor, and the memory stores program instructions executable by the processor to implement a playing module that may be configured to perform receiving an animation object map. The animation object map may assign an animation object to each region in a collection of regions of a viewing area. The playing module may further be configured to perform receiving a synchronization shading map that assigns a shade to each region in the collection of regions of the viewing area. At least two of the shades assigned to regions in the collection of regions differ in intensity. The playing module may also be configured to perform playing, within each region of the collection of regions, the animation object assigned to the region by the animation object map. The playing may include determining a start time for each of the regions in the collection of regions. The start time for each particular region depends upon an intensity of a shade assigned to the particular region by the synchronization shading map. Ones of the collection of regions having different shades differ in their respective start times based on a difference in intensities of shades assigned to those regions by the synchronization shading map. The playing may also involve, for each region of the collection of regions, starting playing within the region the animation object that is assigned to the region by the animation object map, so that the playing of the animation object within the region begins at the start time determined for the region.

Further embodiments of systems and methods for synchronizing the playing of animation objects in several regions of a viewing area are disclosed. In one embodiment, the system may include a computer-readable storage medium storing program instructions that are computer-executable to perform receiving an animation object map. The animation object map may assign an animation object to each region in a collection of regions of a viewing area. The program instructions may be further executable to perform receiving a synchronization shading map that assigns a shade to each region in the collection of regions of the viewing area. At least two of the shades assigned to regions in the collection of regions differ in intensity. The program instructions may encompass playing, within each region of the collection of regions, the animation object assigned to the region by the animation object map. The playing may include determining a start time for each of the regions in the collection of regions. The start time for each particular region depends upon an intensity of a shade assigned to the particular region by the synchronization shading map. Ones of the collection of regions having different shades differ in their respective start times based on a difference in intensities of shades assigned to those regions by the synchronization shading map. The playing may also involve, for each region of the collection of regions, starting playing within the region the animation object that is assigned to the region by the animation object map, so that the playing of the animation object within the region begins at the start time determined for the region.

Figure 1:
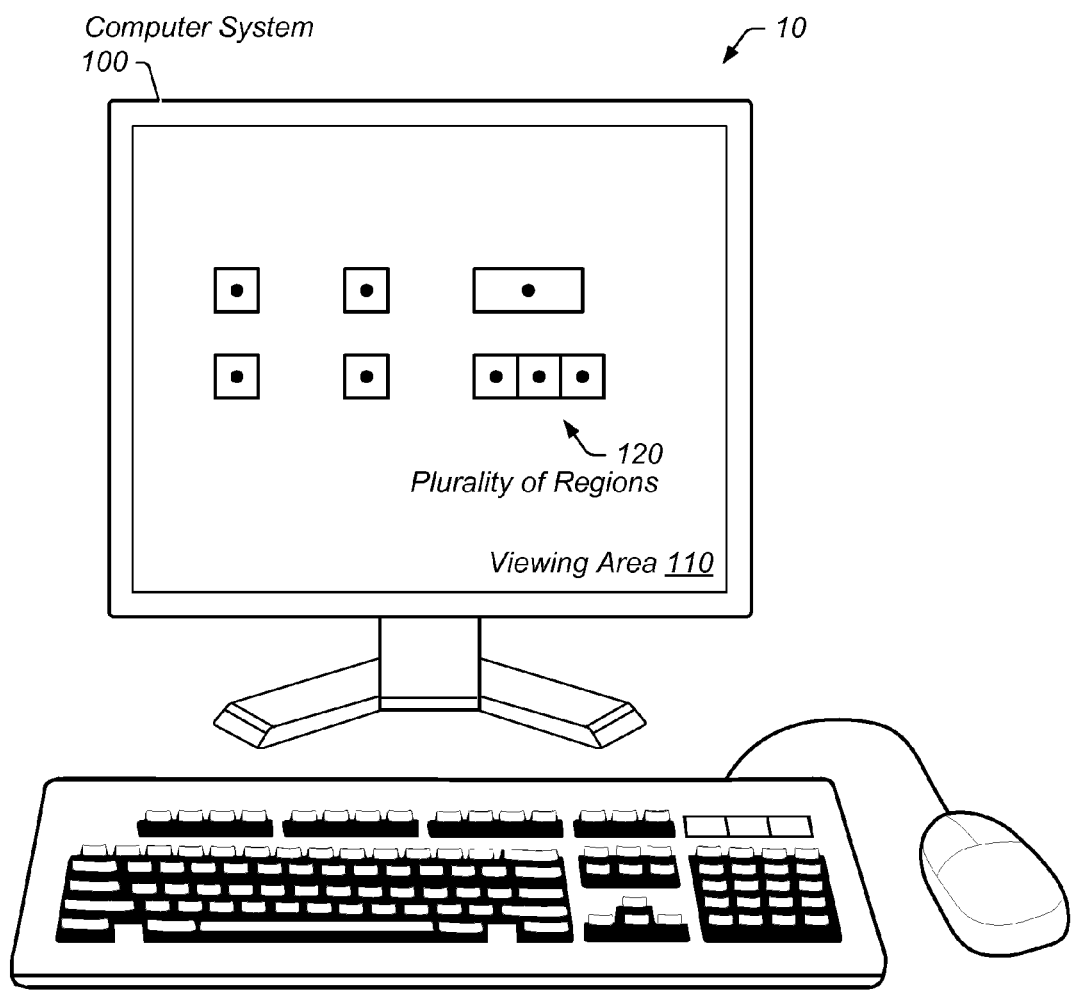
FIG. 1 illustrates one embodiment of a computer system configured to synchronize the playing of animation objects in several regions of a viewing area.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

INTRODUCTION

As mentioned above, the graphic arts have evolved to include specialized computer software and hardware designed to produce video animation sequences, but some of the associated conventional techniques can be non-intuitive or time-consuming. For example, in order to create a showing of animation objects within multiple regions of a viewing area so that the playing of the animation objects within the regions is synchronized, an author may use a conventional timeline. Depending on complexity of the animation objects and the number of regions within which they may be shown, an author may have to manually place a large number of objects on one or more timelines, and to keep track of the relative positions of the objects both within a single timeline and among a collection of timelines. The process of physically manipulating objects onto one or more timelines, and of simultaneously coordinating the independencies of the multitude of objects upon the one or more timelines can be a daunting challenge. Other techniques requiring the manipulation of mathematical curves to synchronize the playing of the animation objects can be similarly burdensome, as well as complex and non-intuitive. The continued evolution of software and hardware affords an opportunity to augment presently-known conventional techniques with new methods which are more direct and more intuitive, and are less cumbersome and less time-consuming.

In the following discussion, various embodiments of systems and methods for synchronizing the playing of animation objects within multiple regions of a viewing area are explored. In particular, there is a detailed description of several intuitive mappings onto multiple regions of a viewing area. In a clear and direct way, these maps may be used to synchronize the playing of animation objects across multiple regions of a viewing area. There is a discussion of the manner in which the playing of animation objects within a multiplicity of regions may be controlled by the maps, and of various interfaces for creating, configuring, and controlling effects of the maps. Methods for creating the maps are illuminated as well.

The systems and methods described below afford quick, natural, and easy techniques for synchronizing the playing of animation objects across multiple regions of a viewing area.

They facilitate speedy experimentation with multiple variations, rapid prototyping and testing, and consonant swift development and convergence towards a final design.

Synchronized Playing of Animation Objects

One embodiment of a system for synchronizing the playing of animation objects across multiple regions of a viewing area is illustrated in FIG. 1. In the illustrated embodiment, synchronized playing system 10 (or simply, system 10) includes a computer system 100 that has a viewing area 110 configured to display a plurality of regions 120. Computer system 100 is configured to display, within the plurality of regions 120, a synchronized playing of one or more animation objects.

Generally speaking, computer system 100 may correspond to any suitable type of computer system configured to execute applications. For example, computer system 100 may correspond to a desktop computer system, a laptop or notebook computer, a handheld computing device such as a personal digital assistant, cellular phone, media player, or combination device, or any other suitable type of device. In various embodiments, computer system 100 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, or similar device. They may also include an image scanner or web cam for image or video input. Output systems may variously include a video subsystem including a video monitor or other display device, an audio subsystem, or other types of output devices. In some embodiments, computer system 100 may be configured to execute one or more operating systems, such as Microsoft Windows™, Apple MacOS™, Linux™, or any other suitable operating systems.

Figure 15:
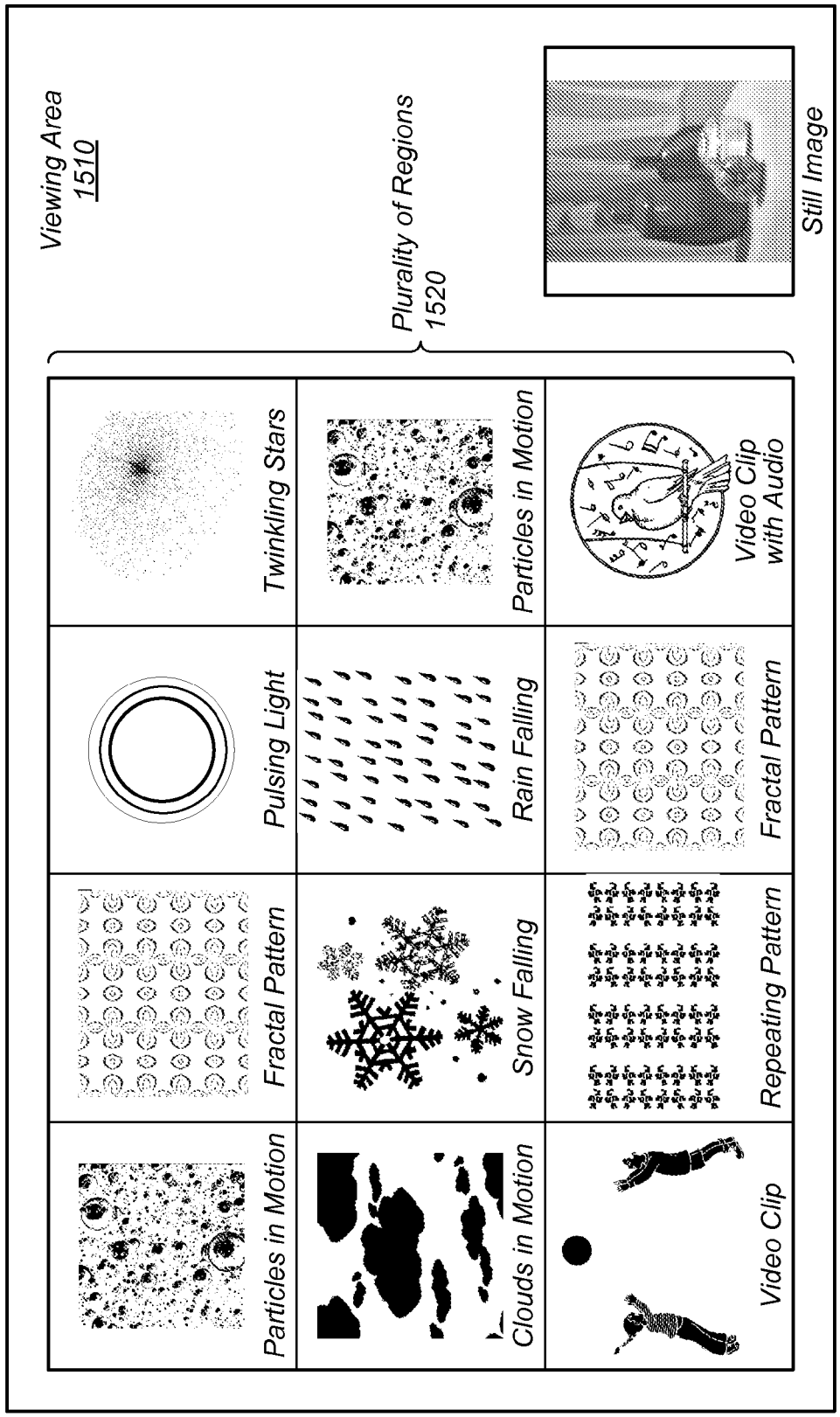
FIG. 15 shows an embodiment in which a rectangular grid of regions of a viewing area are playing a variety of types of animation objects.

In various embodiments, viewing area 110 may be configured to display any of a wide variety of regions 120, and regions 120 may play within themselves a wide variety of animation objects. The plurality of regions 120 many include contiguous blocks of regions, or it may include regions which are non-contiguous, or both. For example, the plurality of regions 120 illustrated in FIG. 1 includes a block of three contiguous regions, together with 5 regions positioned separately from each other. Each one of a plurality of regions 120 may play any of multiple types of animation objects. In some embodiments, plurality of regions 120 may play animation objects that include, during the time they are being played, a representation of one or more particles which move or change, a representation of one or more objects which twinkle, pulse or blink, a representation of one or more fractal geometric patterns, a representation of one or more weather elements, video content, repetitive motion, or audible content. For example, FIG. 15 shows an embodiment in which a rectangular grid of regions of a viewing area are playing a variety of types of animation objects. During their playing, the illustrated animation objects variously represent particles in motion, fractal geometric patterns, pulsing light, twinkling stars, clouds in motion, falling snow, falling rain, people playing ball, a repeating pattern, and a moving bird whose singing is audible. Another region of the viewing area that is not included in the rectangular grid of regions is shown outside the rectangular grid, with a still image displayed within it. In other embodiments, animation objects being played within the plurality of regions 120 may represent natural phenomena likes dust particles in motion, tornadic winds, migrating insects, shifting tectonic structures, glacial migration, electrical patterns, shifting geophysical structures, subatomic particles, or others of a great variety of dynamic phenomena.

Figure 2:
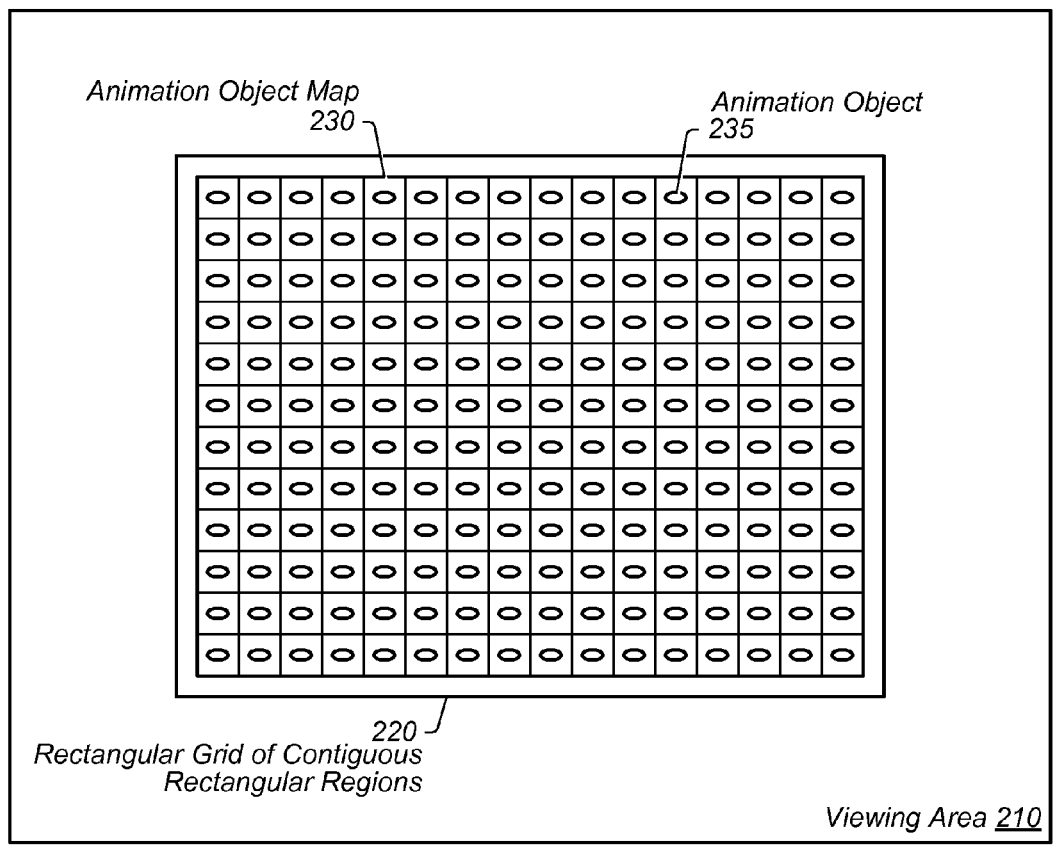
FIG. 2 illustrates one embodiment of an animation object map
Figure 14A:
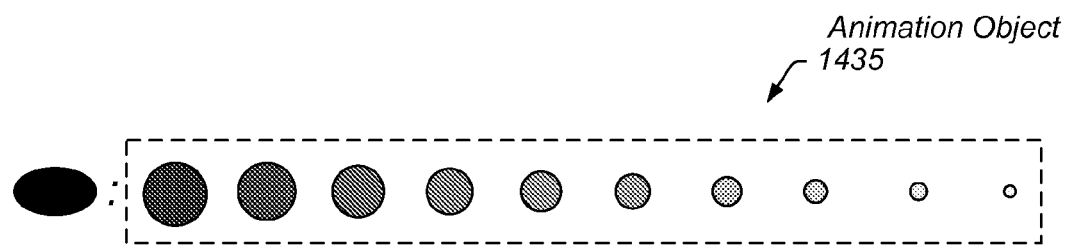
FIG. 14A shows an embodiment of an animation object.

Various embodiments of systems for playing animation objects in synchronization with each other, within several regions of a viewing area, may involve the use of an animation object map which assigns (maps) an animation object to each region of a plurality of regions of a viewing area. FIG. 2 illustrates one embodiment of an animation object map. In the illustrated embodiment, viewing area 210 displays a rectangular grid of contiguous rectangular regions 220. In this embodiment, animation object map 230 assigns the same animation object 235 to each region in the illustrated rectangular grid of contiguous rectangular regions 220 of viewing area 210. Animation object 235 is represented by an oval that appears inside each of the regions in the rectangular grid of contiguous rectangular regions 220. For the embodiment shown in FIG. 2, the same animation object 235 plays within all of the regions 220. The start time for each of the regions in the rectangular grid of contiguous rectangular regions 220, that is, the time at which each region begins its own playing of animation object 235, is determined by an intensity of a shade assigned to the region, as described below. The various intensities of shades assigned to regions 220 determine how the playing of animation object 235 is synchronized across all of the regions 220. FIGS. 14A through 14E form an interrelated collection of drawings which further illustrate the sort of embodiment depicted in FIG. 2. For example, animation object 235 of FIG. 2 may be realized as animation object 1435 presented in FIG. 14A. Animation object map 230 of FIG. 2 may be compared to animation object map 1430 of FIG. 14B. Viewing area 210 of FIG. 2 may be associated with viewing area 1410 of FIGS. 14C and 14E. The playing of animation object 235 within each of the contiguous rectangular regions 220, such that the playing is synchronized across all of the contiguous rectangular regions 220, is illustrated in FIGS. 14D-E, and described in subsequent paragraphs. It is not always necessary that an animation object map assign the same animation object to each region in a collection of regions. For example, FIGS. 3 and 15 picture embodiments in which an animation object map assigns different animation objects to various ones of a collection of regions.

Figure 3:
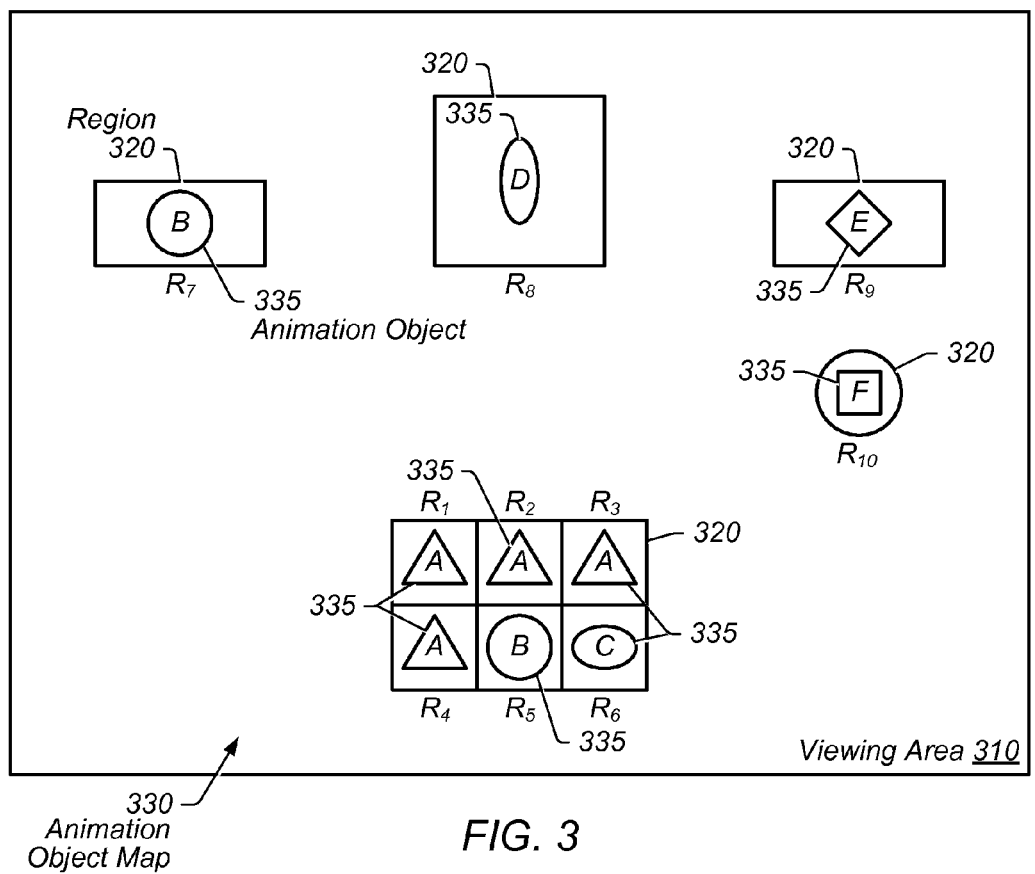
FIG. 3 illustrates another embodiment of an animation object map.

FIG. 3 illustrates another embodiment of an animation object map used in an embodiment of a system for playing animation objects in synchronization with each other, within several regions of a viewing area. Here an animation object map assigns several different animation objects to several different regions of an irregular collection of regions of a viewing area. The viewing area contains 10 regions, labeled $R_1$ through $R_{10}$. Animation objects A, B, C, D, E, and F are assigned to the regions $R_1$ through $R_{10}$ by the animation object map. In the illustrated embodiment, viewing area 310 displays the irregular collection of regions 320. Regions 320 include a block of contiguous rectangular regions $R_1$ through $R_6$. The irregular collection of regions 320 also includes three rectangular regions $R_7$, $R_8$, and $R_9$ which are positioned separately from each other in viewing area 310. Region $R_{10}$ has a circular shape, and is positioned separately from regions $R_1$ through $R_9$. Animation object map 330 assigns several animation objects 335 to regions $R_1$ through $R_{10}$. Animation objects 335 include animation objects A, B, C, D, E, and F. Animation object map 330 assigns animation object A to each of regions $R_1$ through $R_4$. Animation object map 330 assigns animation object B to region $R_5$ and to region $R_7$. Animation object map 330 assigns animation object C to region $R_6$, and it assigns animation object D to region $R_8$, animation object E to region $R_9$, and animation object F to region $R_{10}$. In some instances, animation objects A, B, C, D, E, and F may be realized as objects like the ones shown in FIG. 15, which portrays different types of animation objects playing within a collection of regions. Animation objects A, B, C, D, E, and F play within the various regions to which they are assigned by animation object map 330. The start time for each of the regions 320, that is, the time at which each one of regions $R_1$ through $R_{10}$ begins its own playing of the animation object 335 assigned to it, is determined by an intensity of a shade assigned to the region, as described below. The various intensities of shades assigned to regions 320 determine how the playing of animation objects 335 is synchronized across all of the regions 320.

Various embodiments of systems for playing animation objects within several regions of a viewing area, such that the playing is synchronized across the several regions, may also involve the use of map which assigns a shade to each of the several regions of the viewing area. In various embodiments, such a map may assign shades of varying intensities to the several regions, and is referred to as a synchronization shading map. The variation in intensities of shades assigned to a plurality of regions in a viewing area by a synchronization shading map is used to determine how the playing of animation objects assigned to the plurality of regions is synchronized across the plurality of regions.

Figure 4:
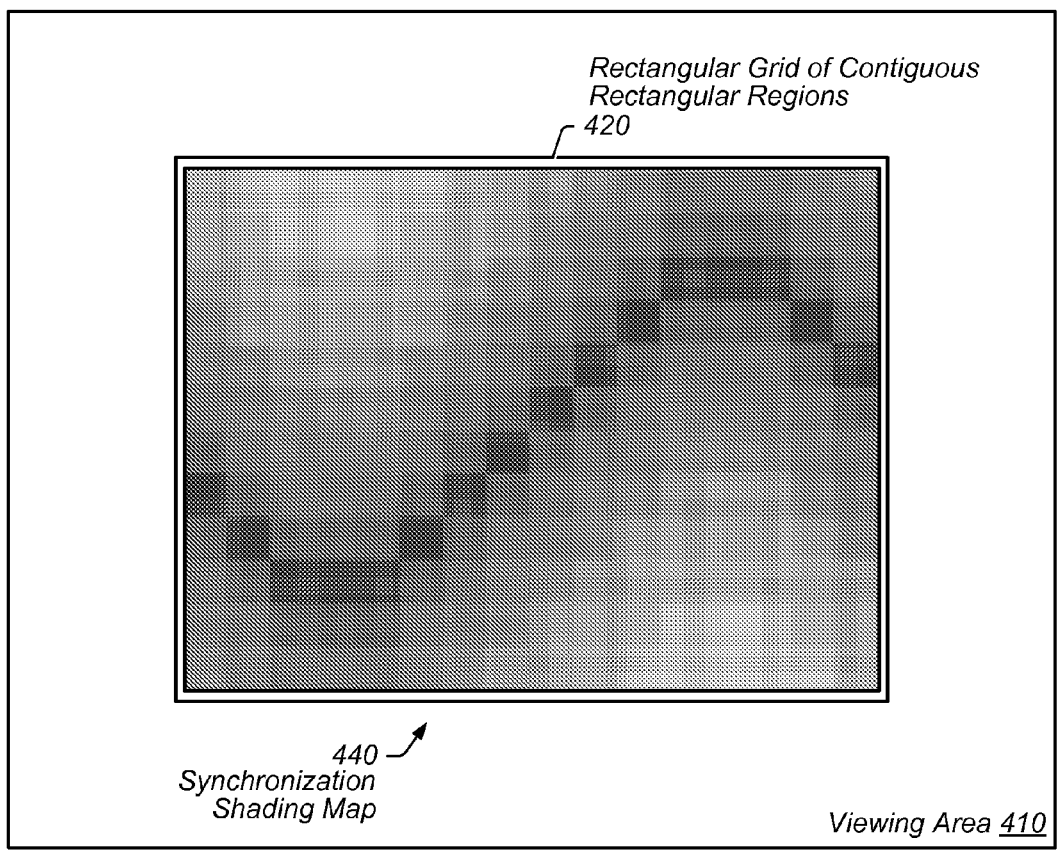
FIG. 4 illustrates one embodiment of a synchronization shading map.

FIG. 4 illustrates one embodiment of a synchronization shading map. In this embodiment, synchronization shading map 440 assigns various shades of gray to a collection of contiguous rectangular regions 420 of a viewing area 410, where the contiguous regions form a grid. The time at which each particular region in the illustrated collection of regions 420 begins playing an animation object assigned to that particular region depends on the intensity of the shade assigned to it by synchronization shading map 440. In some embodiments, regions assigned darker shades by synchronization shading map 440 begin playing animation objects assigned to them by an animation object map earlier than do regions which are assigned lighter shades. For example, the regions shaded black by the illustrated synchronization shading map 440 may simultaneously start playing animation objects assigned to them earlier than do other regions that have lighter shades. Some time after the regions shaded black begin playing animation objects, the regions shaded in the next-darkest intensity may simultaneously begin to play animation objects assigned to them. The progression of playing may thus continue, so that each group of one or more regions shaded in a particular intensity begins to play assigned animation objects earlier than another group of one or more regions shaded in a next-lighter intensity. The regions shaded in the lightest intensity start to play animation objects later than do other regions. In other embodiments, the effect of shade intensities assigned to regions 420 by synchronization shading map 440 may be reversed, or altered in some other fashion. For example, regions shaded in the lightest intensity may begin playing earlier than do other regions, and regions shaded in the darkest intensity may begin playing later than do other regions. It is the differences in intensities of shades assigned to the various regions 420 that determine differences in start times for the various regions 420.

A map similar to synchronization shading map 440 may be applied to the contiguous rectangular regions 220 of FIG. 2. Shading tool 750 of FIG. 7 may be used to create synchronization shading map 440, as explained below. The effects of applying synchronization shading map 440 in determining differences in start times for the various regions 420 may be controlled by means of interfaces like the ones represented in FIGS. 8-10.

Figure 5:
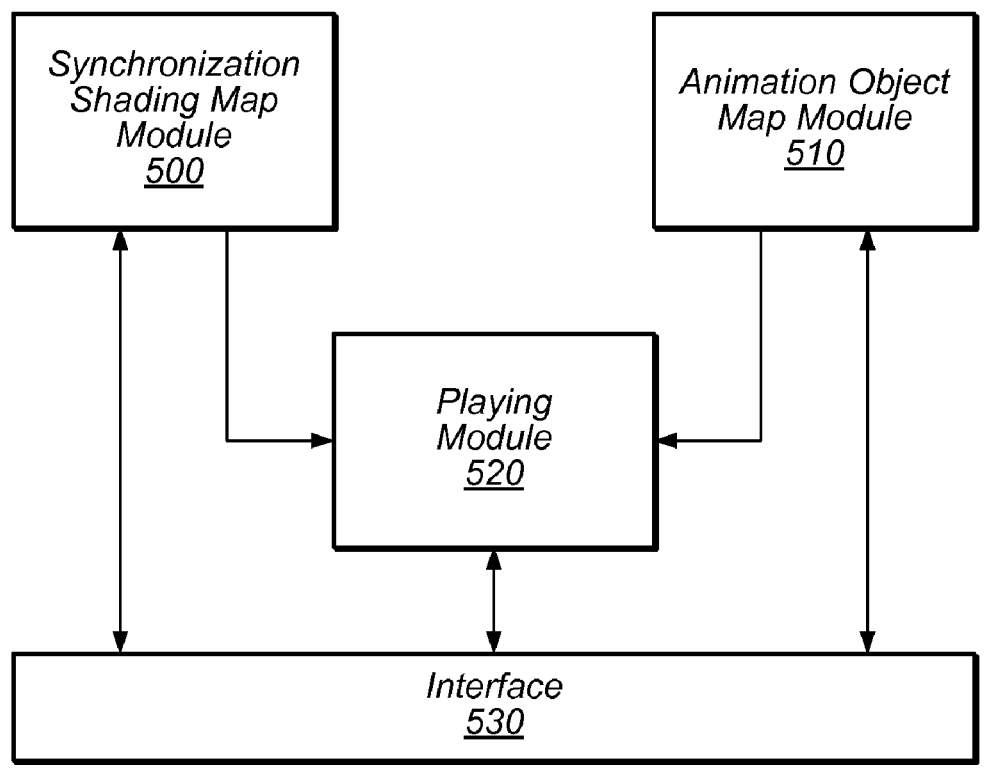
FIG. 5 shows various components of one embodiment of a system for synchronizing the playing of animation objects in several regions of a viewing area.

Embodiments of systems for playing animation objects within several regions of a viewing area, such that the playing is synchronized across the several regions, may include a synchronization shading map module, an animation object map module, a playing module, and an interface linked to the modules, as illustrated in FIG. 5.

According to some embodiments, animation object map module 510 of FIG. 5 may supply one or more animation object maps to playing module 520. In some embodiments, animation object map module 510 may receive one or more animation object maps from a source external to the system shown in FIG. 5. According to other embodiments, animation object map module 510 may be configured to create one or more animation object maps. The creation of animation object maps by animation object map module 510 may be automated in some embodiments, or it may be manually controlled in other embodiments. Interface 530 may be configured to facilitate creation of animation object maps by animation object map module 510, and may allow configuration of the creation of animation object maps by animation object map module 510. Interface 530 may be configured to actively manage the details of creating animation object maps using animation object map module 510. For example, interface 530 may allow control of the size and type of animation objects being created. Interface 530 may also allow animation object map module 510 to access external resources to facilitate the creation of animation object maps. In some embodiments, animation object map module 510 may store animation object maps that it receives, or it may store animation object maps that it creates. Storage of animation object maps may occur either locally or remotely.

According to some embodiments, synchronization shading map module 500 of FIG. 5 may supply one or more synchronization shading maps to playing module 520. Similarly to animation object map module 510, synchronization shading map module 500 may, according to various embodiments, either receive one or more synchronization shading maps, or generate synchronization shading maps. In some embodiments, synchronization shading map module 500 may receive one or more synchronization shading maps from a source external to the system shown in FIG. 5. According to other embodiments, synchronization shading map module 500 may be configured to create one or more synchronization shading maps. The creation of synchronization shading maps by synchronization shading map module 500 may be automated in some embodiments, or it may be manually controlled in other embodiments. Interface 530 may be configured to facilitate creation of synchronization shading maps by synchronization shading map module 500, and may allow configuration of the creation of synchronization shading maps by synchronization shading map module 500. Interface 530 may be configured to actively manage the details of creating synchronization shading maps using synchronization shading map module 500. For example, interface 530 may allow control of the size and type of synchronization shading maps being created. Interface 530 may also allow synchronization shading map module 500 to access external resources to facilitate the creation of synchronization shading maps. In some embodiments, synchronization shading map module 500 may store synchronization shading maps that it receives, or it may store synchronization shading maps that it creates. Storage of synchronization shading maps may occur either locally or remotely.

Playing module 520 of FIG. 5 may, according to some embodiments, receive animation object maps from animation object map module 510, and it may receive synchronization shading maps from synchronization shading map module 500. Playing module 520 may begin playing, within each region of a plurality of regions of a viewing area, an animation object assigned to the region by an animation object map. Playing module 520 may synchronize the playing across all regions in the plurality of regions. The synchronization may involve determining a start time for each of the regions in a plurality of regions, where the start time for each particular region depends upon an intensity of a shade assigned to the particular region by a synchronization shading map, and where ones of the plurality of regions having different shades differ in their respective start times based on a difference in intensities of shades assigned to those regions by the synchronization shading map. The synchronization may further entail, for each region of the plurality of regions, starting playing within the region the animation object that is assigned to the region by the animation object map, where the playing of the animation object within the region begins at the start time determined for the region.

Interface 530 of FIG. 5 may be embodied as an application programming interface that is automatically invoked by software or hardware components, or it may be embodied as a graphical interface or an application programming interface that is invoked by a developer, author, artist, or other individual who is structuring the playing of animation objects in synchronization with each other, within several regions of a viewing area. Interface 530 may also be embodied as a tangible interface displayed on a viewing screen. Such tangible, visible embodiments of interface 530 may be passive or may be interactive. Particular forms taken by interface 530 may vary widely according to numerous or diverse embodiments. FIGS. 2, 3, 4, 7, 8, 9, 10, 12, 13, and 14 depict several visible embodiments of interface 530.

It is noted that the architecture illustrated in FIG. 5 is merely one example, and that other configurations are possible. For example, in various embodiments, the functionality of animation object map module 510 may be implemented wholly or partially within another element, such as synchronization shading map module 500, or may be distributed among a number of modules or components, or may be implemented wholly or partially within an operating system, or within external entities. For another example, some portion of the functionality of playing module 520 may be implemented an application external to the system shown in FIG. 5. In general, the full capabilities of the system for synchronizing the playing of animation objects across multiple regions of a viewing area, and incorporated in the architectural embodiment shown in FIG. 5, may also be incorporated in other architectural embodiments.

Figure 6:
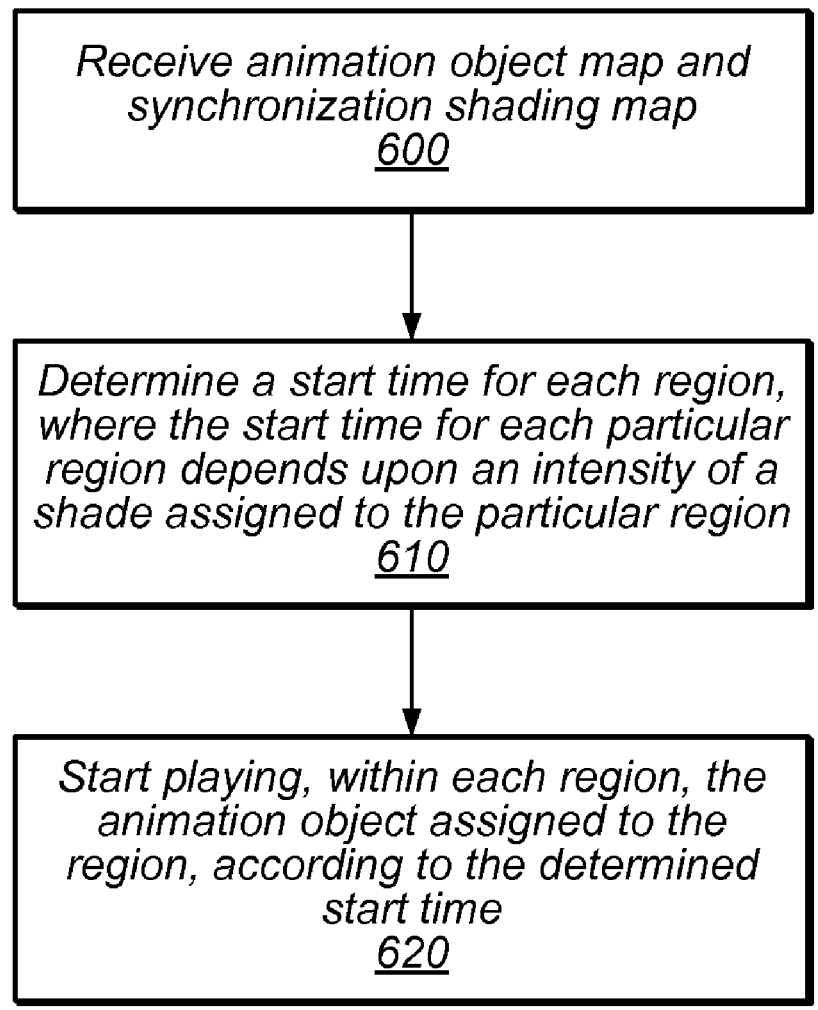
FIG. 6 is a flow diagram illustrating one embodiment of a method for synchronizing the playing of animation objects in several regions of a viewing area.

The flow chart provided in FIG. 6 encapsulates the main operational stages of a system for synchronizing the playing of animation objects across a plurality of regions of a viewing area. In the illustrated embodiment, operation begins in block 600, where an animation object map and a synchronization shading map are received. As discussed above, animation object map module 510 of FIG. 5 may supply one or more animation object maps, and synchronization shading map module 500 of FIG. 5 may supply one or more synchronization shading maps. Examples of received animation object maps may be found in FIGS. 2, 3, 14B, and, implicitly, in FIG. 15. FIG. 14A shows a frame-by-frame depiction of an animation object map in the form of a video clip containing ten frames that appear successively at 1-second intervals. The first frame displays a large, dark circle, and the succeeding nine frames display circles of ever-diminishing size and intensity. Examples of received synchronization shading maps appear in FIGS. 4, 7, 8, and 14C. The discussion of FIG. 7 that follows presents methods for creating synchronization shading maps. An application running on computer system 100 may receive an animation object map and a synchronization shading map either automatically or in response to user interaction through an application interface. Computer system 100 may store the maps in memory or in a separate file.

Figure 7:
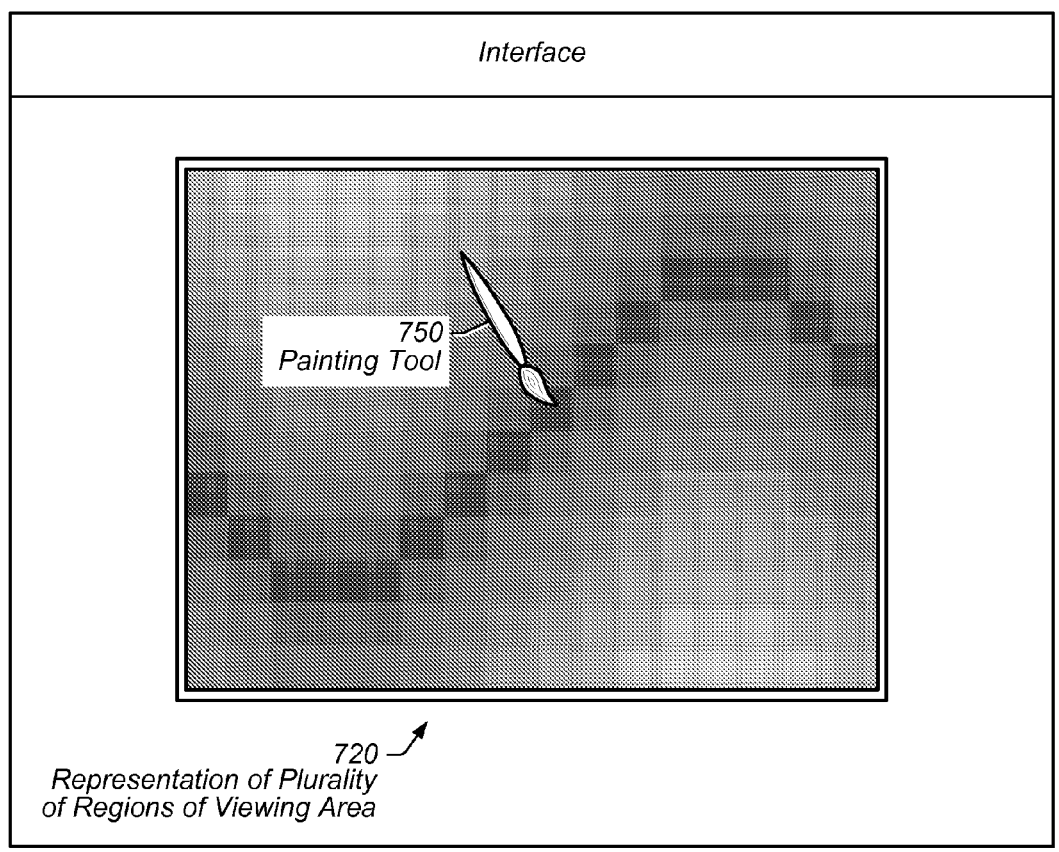
FIG. 7 depicts one embodiment of an interface for creating a synchronization shading map.
Figure 8:
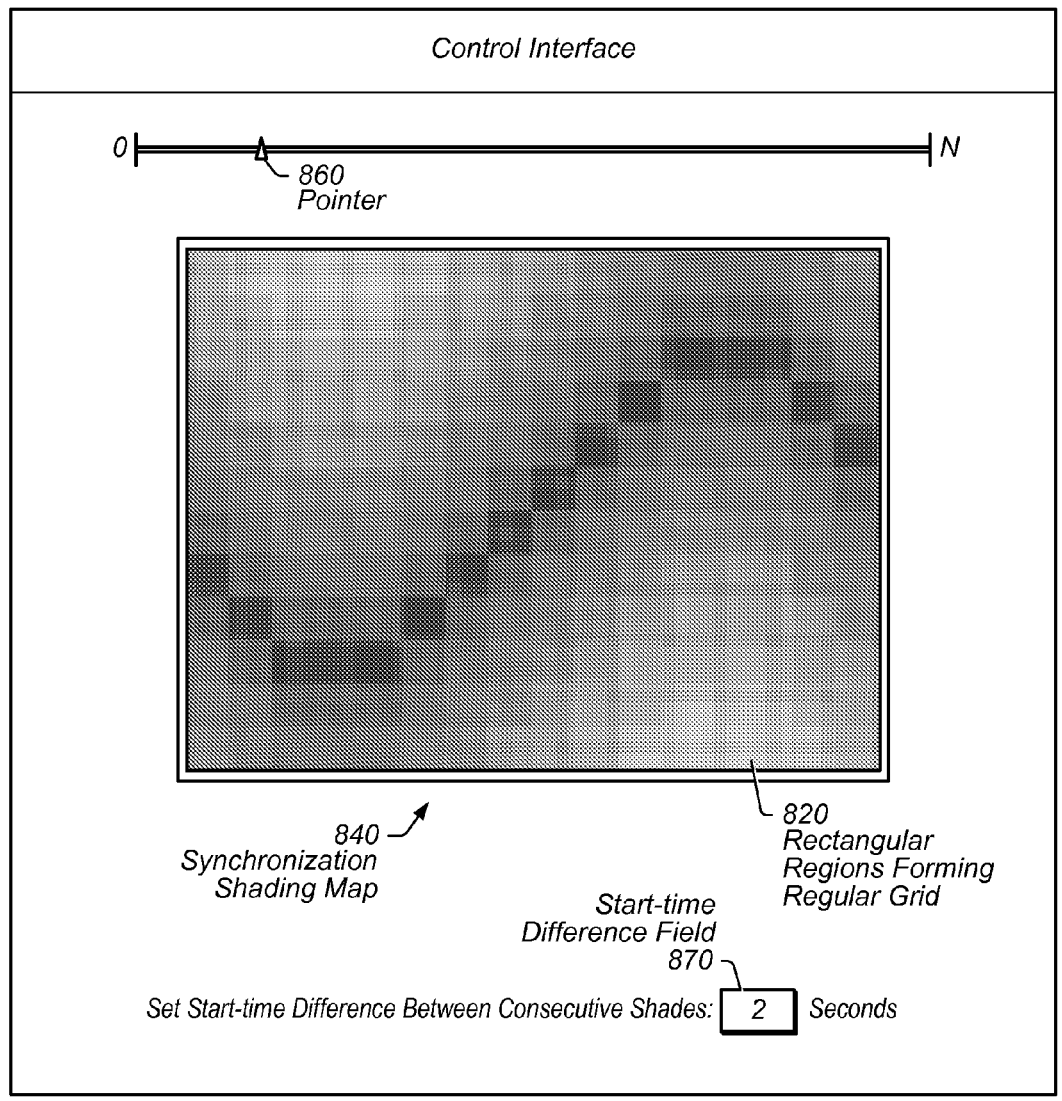
FIG. 8 depicts one embodiment of a control interface.
Figure 9A:
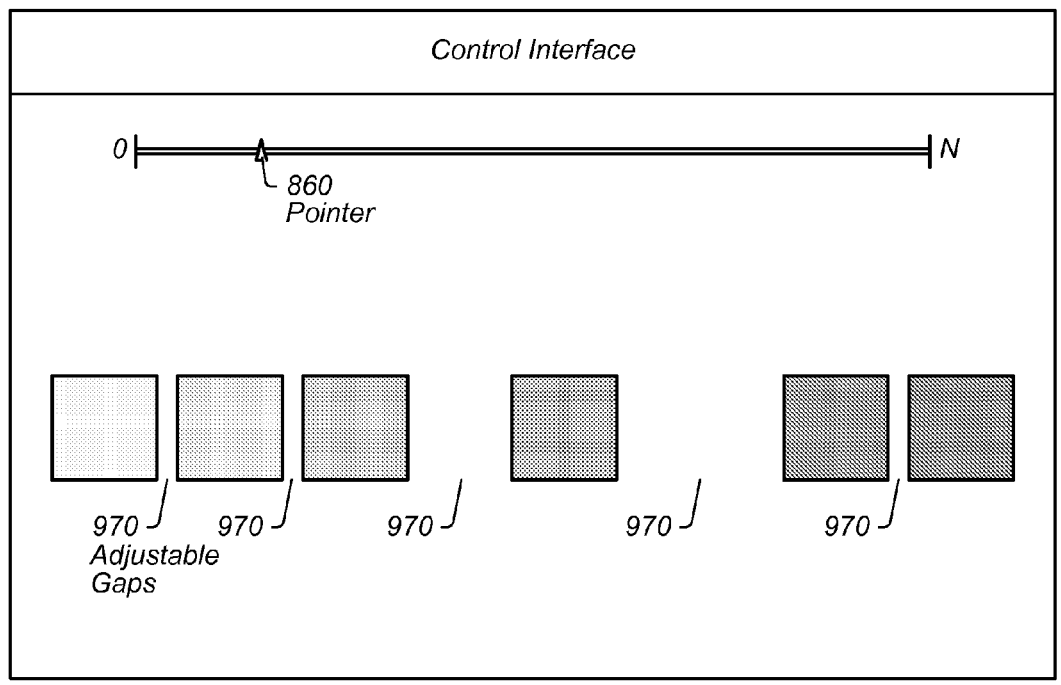
FIGS. 9A and 9B depict other embodiments of a control interface.

At block 610 of FIG. 6, a start time is determined for each region of the plurality of regions of the viewing area, where the start time for each particular region depends upon an intensity of a shade assigned to the particular region by the synchronization shading map. A plurality of regions of a viewing area may take many forms, and examples appear in FIGS. 1-4, 7-8, 14B-C, 14E, and 15. The foregoing discussion of FIG. 4 furnishes an illustrative description of the determination of a start time for each region of a plurality of regions of a viewing area. FIGS. 8-10 present typical interfaces for configuring and controlling effects of synchronization shading maps in determining differences in start times for various regions. An application running on computer system 100 may determine a start time for each region in response to receiving user input through an interface such as the ones depicted in FIGS. 8-10, or through another embodiment of a control interface.

Finally, at block 620, playing begins, within each region of the plurality of regions, of an animation object assigned to the region, so that within any particular region, playing begins at the start time determined for that particular region. FIGS. 14A-E provide an example of a synchronized playing of an animation object assigned to each region of a plurality of regions. Computer system 100 may commence the playing of one or more animation objects across the plurality of regions in response to receiving input from a user to initiate the playing.

As explained above, interface 530 of FIG. 5 may be visibly embodied in numerous or diverse ways. FIG. 7 depicts one embodiment of a visible interface for creating a synchronization shading map. In this embodiment, a representation of a plurality of regions 720 of a viewing area is displayed, and a painting tool 750 is provided for painting a visible shade onto each region of the representation. Painting tool 750 is shown tracing a path through the plurality of regions 720. In this embodiment, painting tool 750 is configured to make regions lying along its path turn black, and to cause regions off its path to turn various shades of gray. The farther a region is located from the path taken by painting tool 750, the lighter will be the shade painted onto the region. In this manner, a single pass with painting tool 750 can paint visible shades of gray onto each of the plurality of regions 720. In this embodiment, painting tool 750 performs as a gradient-painting device. The result is the synchronization shading map seen in FIG. 7. The path taken by painting tool 750 as it moves across the plurality of regions 720 is indicated by the black regions, which lie on a curve similar to a sine wave. Painting tool 750 may be configured to operate differently in other embodiments. For example, it may be configured to make regions lying along its path turn white instead of black, and to cause regions off its path to turn various shades of gray, such that the farther a region is located from the path taken by the painting tool 750, the darker will be the shade painted onto it. In still other embodiments, painting tool 750 may be configured to operate in a variety of ways. Painting tool 750 serves to create a synchronization shading map. This and other methods for painting a visible shade onto each region in the plurality of regions 720 may facilitate rapid, intuitive, and easy creation of synchronization shading maps.

According to various embodiments, painting tool 750 may be configured to paint more than one region at a time. In some embodiments, painting tool 750 may paint several regions at a time without having to touch all of the regions being painted. For example, as illustrated in FIG. 7 and described above, painting tool 750 may trace a path through the plurality of regions 720, touching only a few of the plurality of regions 720, such that the touched regions turn black, but regions not touched turn various shades of gray. In this example, the farther a region is located from the path taken by painting tool 750, the lighter will be the shade that is automatically painted onto the region. Here, painting tool 750 performs as a gradient-painting device.

In other embodiments, painting tool 750 may be configured to touch all of the regions that it paints, whether functioning as a gradient-painting device or not. In some such instances, painting tool 750 may be embodied as a broad brush, with various shade intensities corresponding to various portions of the broad brush.

As indicated in the discussion of FIG. 7, painting tool 750 may be configured to paint several regions simultaneously, and it may be configured to paint several visible shades simultaneously. In other embodiments, painting tool 750 may be configured to paint one region at a time. Painting tool 750 may also be configured to paint one visible shade at a time.

While the embodiment of painting tool 750 illustrated in FIG. 7 applies visible shades of gray, there are other embodiments in which painting tool 750 applies visible colors that are neither gray nor black nor white. For example, painting tool 750 may be configured to paint various shades of orange onto a plurality of regions 720. In such an instance, intensity values may be established for each of the various shades of orange, such that the intensity values impose a sequential ordering on the various shades of orange. The intensity ordering for the various shades of orange enables the full functionality of the systems, methods, and techniques described herein for synchronizing the playing of animation objects across a plurality of regions of a viewing area. In other embodiments, painting tool 750 may be configured to apply any other colors from the visible spectrum, including, but not limited to, red, yellow, blue, green, and violet.

A palette may also be provided to allow a user to choose, from among several shades or colors, a current shade or shades or color or colors that may be applied by painting tool 750.

FIG. 8 illustrates another embodiment of a visible interface. In this instance, it is a control interface for controlling the form and effect of synchronization shading map. Pointer 860 permits choosing a number between 0 and N to be the maximum number of shades used in synchronization shading map 840. Start-time difference field 870 permits setting a difference in start times for regions painted in consecutive shades by the synchronization shading map. In this illustration, the start-time difference between regions matching two consecutive shades is set at 2 seconds, where the two shades are consecutive in an ordering, by intensity, of all the shades used in the synchronization shading map. When the playing of animation objects is synchronized across the plurality of regions 820 shown in synchronization shading map 840, there is a two-second gap between the starting times for regions painted in consecutive shades. In this embodiment, the start-time difference for any pair of regions painted with two consecutive shades is 2 seconds. In other embodiments, such a start-time difference may be set differently, for example, to 3 seconds, or to 5 seconds, or to some other period of time.

In other embodiments of a control interface for controlling the form and effect of a synchronization shading map, start-time differences for regions may be controlled differently. For example, there may be a provision for varying the start-time differences according to particular pairs of consecutive shades used in painting a plurality of regions. FIG. 9A illustrates a collection of shaded blocks representing shades used in a synchronization shading map, arranged consecutively in order of intensity. In this embodiment, start-time differences for regions painted in consecutive shades by the synchronization shading map are controlled by narrowing or widening an adjustable gap 970 between blocks representing consecutive shades. For example, the start-time difference between regions painted in a particular consecutive pair of shades may be set to 1 second, while another start-time difference between regions painted in some other consecutive pair of shades may be set to 5 seconds. In this manner, the effect of one pair of consecutive shades upon start times for corresponding regions may be controlled independently of the effect of a different pair of consecutive shades upon start times for regions corresponding to the different pair of consecutive shades.

Figure 9B:
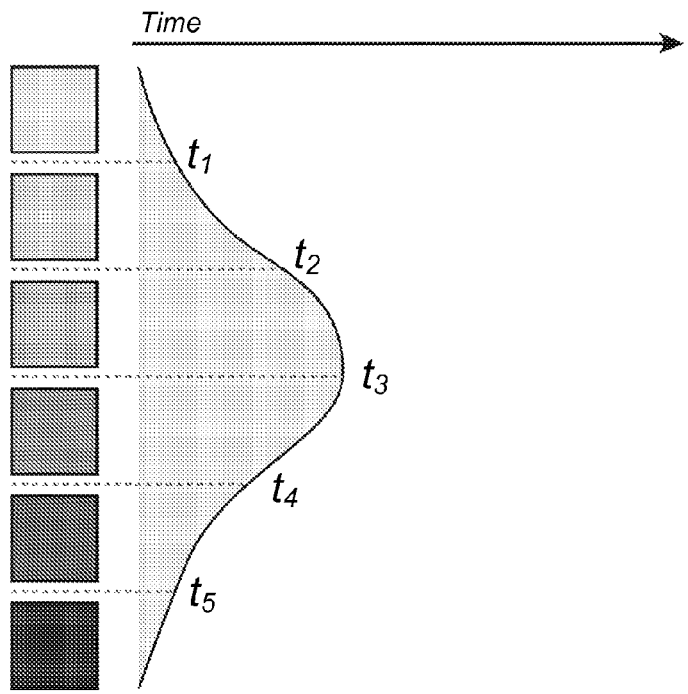
Figure 10:
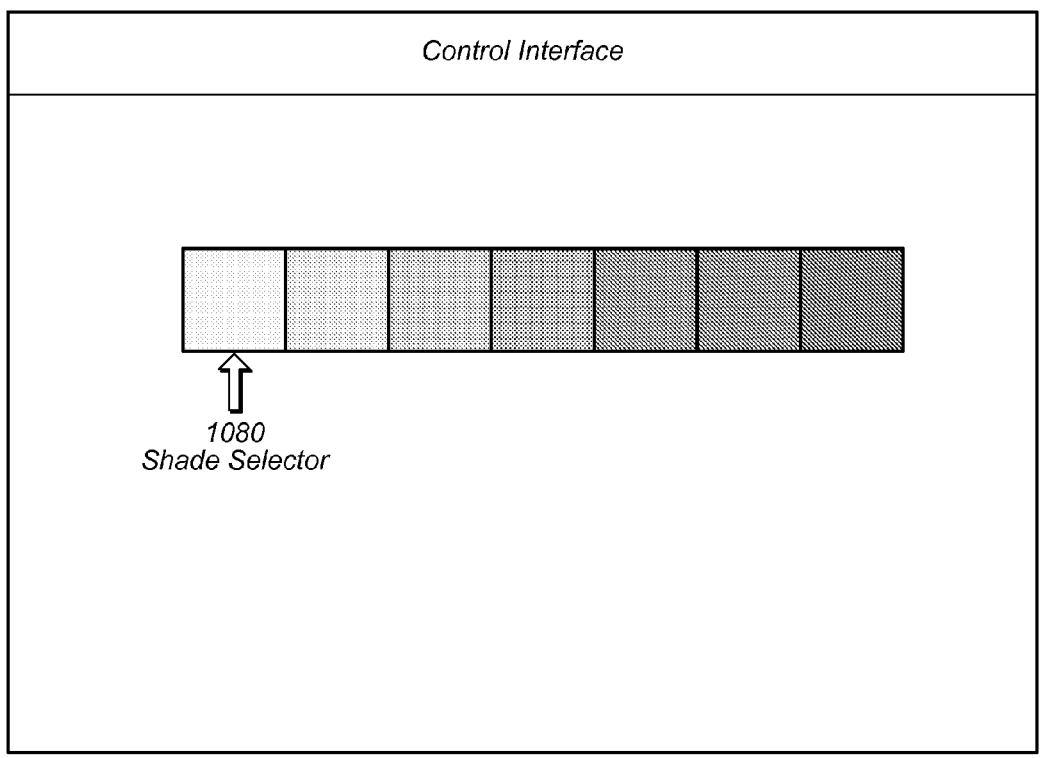
FIG. 10 shows another embodiment of a control interface

FIG. 9B shows an embodiment of another interface for varying the start-time differences according to particular pairs of consecutive shades used in painting a plurality of regions. A collection of shaded blocks representing shades used in a synchronization shading map is arranged consecutively in order of intensity. In this embodiment, start-time differences for regions painted in consecutive shades by the synchronization shading map are controlled by means of a curve shown to the right of the collection of blocks. In the illustrated example, the start-time differences for the various pairs of consecutive shades are listed as $t_1, t_2, t_3, t_4$, and $t_5$ units of time. The largest start-time difference, $t_3$, is the one for regions painted in the pair of consecutive shades shown in the middle of the collection, and the smallest start-time differences, $t_1$ and $t_5$, are for regions painted in the pairs of consecutive shades shown at the top and bottom of the collection.

FIG. 10 illustrates an embodiment of a control interface for selecting, from among a plurality of shades used in a synchronization shading map, one particular shade indicating an earliest of all start times determined for a plurality of regions. Shaded blocks representing shades used in the synchronization shading map are arranged consecutively in order of intensity. Shade selector 1080 may be used to select one of the shaded blocks. Regions to which the synchronization shading map assigns the shade represented by the selected shaded block have the earliest of all the start times determined for the plurality of regions. Playing of an animation object assigned to regions to which the synchronization shading map assigns the shade represented by the selected shaded block begins earlier than playing of an animation object assigned to other regions.

Figure 11:
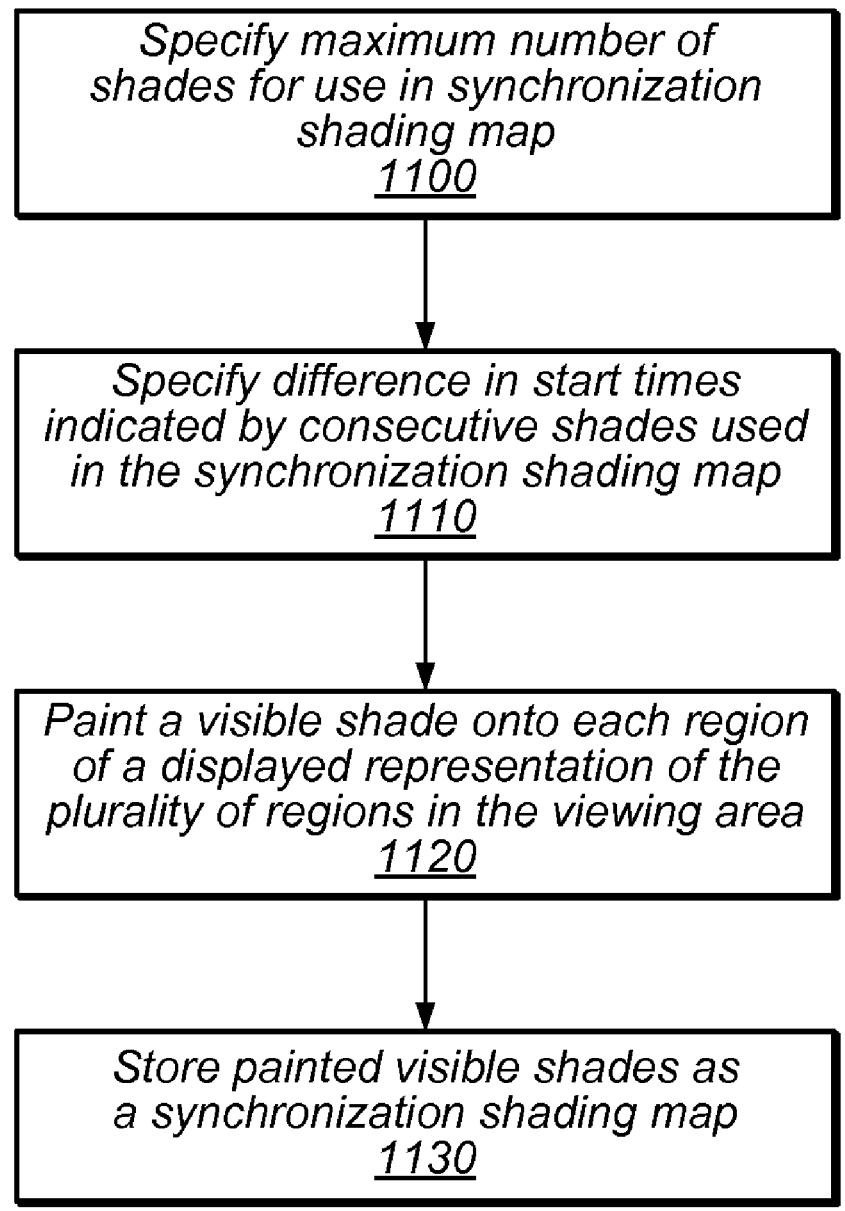
FIG. 11 is a flow diagram illustrating one embodiment of a method for creating a synchronization shading map.

The flow chart of FIG. 11 shows operational stages of one embodiment of a method for creating a synchronization shading map used in a system for synchronizing the playing of animation objects across a plurality of regions of a viewing area. In the illustrated embodiment, operation begins in block 1100, where a maximum number of shades for use in a synchronization shading map is specified. In other embodiments, the specification of a maximum number of shades for use in a synchronization shading map may be given automatically, or may be fixed. FIGS. 8 and 9A present sample interfaces for specifying a maximum number of shades for use in a synchronization shading map. An application running on computer system 100 may receive user input through an interface such as the ones depicted in FIGS. 8-9, or through another embodiment of a control interface. In response to receiving the user input, computer system 100 may store the specified number in a file or memory data structure.

At block 1110, a difference in start times is set for regions painted in consecutive shades by the synchronization shading map. In some embodiments, a difference in start times for regions painted in consecutive shades by the synchronization shading map may be set to a default value, while in others, it may be set to a non-default value. According to various embodiments, the step indicated at block 1110 may be deferred until a later stage, or may occur after creation of the synchronization shading map. An application running on computer system 100 may receive user input through an interface such as the ones depicted in FIGS. 8-9, or through another embodiment of a control interface. In response to receiving the user input, computer system 100 may store the specified start-time differences in a file or memory data structure.

Block 1120 represents the stage of painting a visible shade onto each region of a displayed representation of the plurality of regions in the viewing area. The painting of a visible shade onto each region may be accomplished using an interface provided by an application running on computer system 100, such as the one described in connection with FIG. 7.

The resulting synchronization shading map, created by painting a visible shade onto each region of a displayed representation of the plurality of regions, may then be stored, as indicated in block 1130, by an application running on computer system 100. The storage indicated in block 1130 may be in volatile memory in some embodiments, and it may be in non-volatile media in other embodiments.

Figure 12:
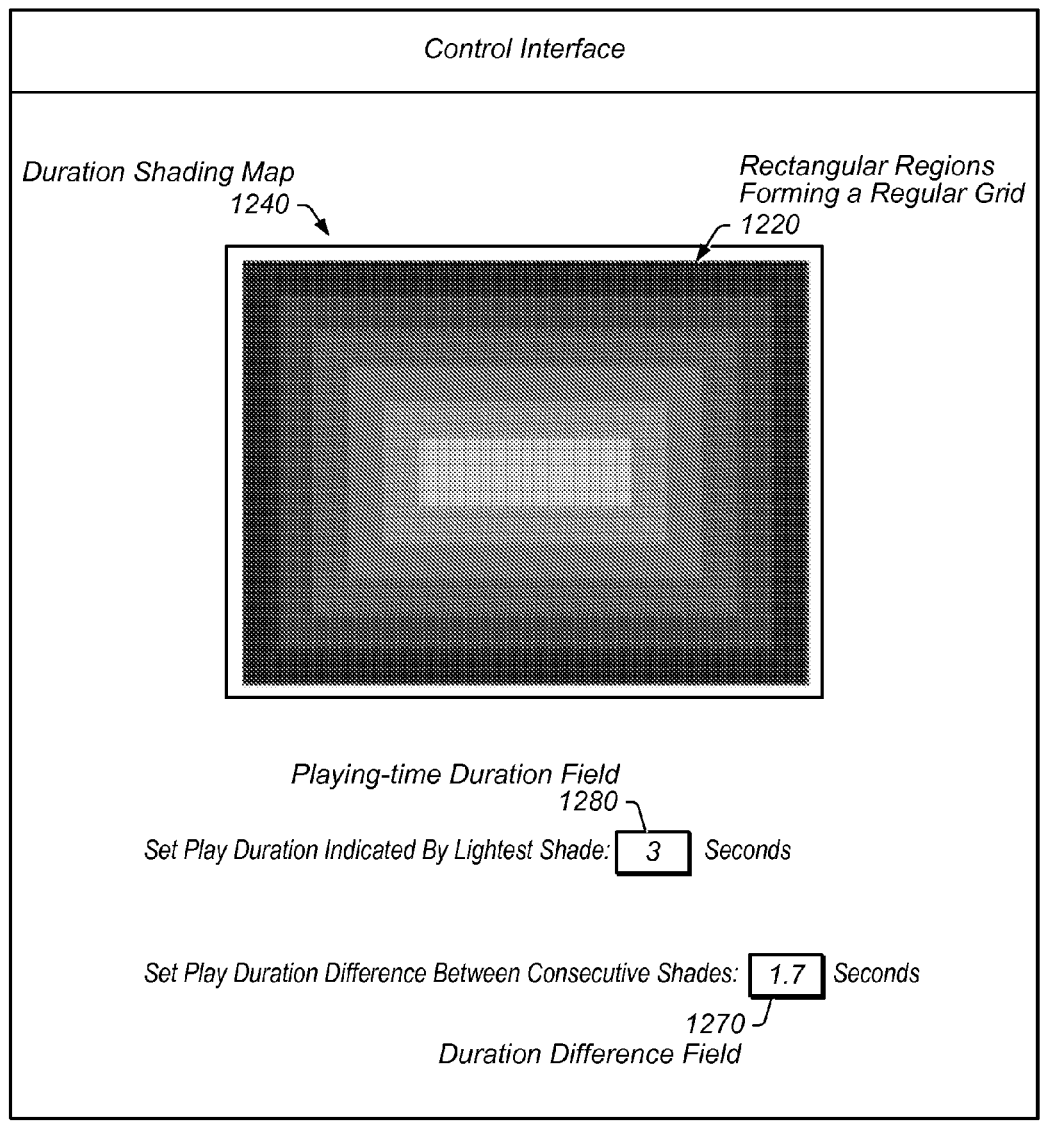
FIG. 12 depicts one embodiment of a control interface.

Various embodiments of a system for playing animation objects in synchronization with each other, within a plurality of regions of a viewing area, may involve the use of a duration shading map. The duration shading map may control the playing-time duration for regions belonging to the plurality of regions in the viewing area. FIG. 12 depicts an embodiment of a control interface for a duration shading map. In this example, a duration shading map 1240 for a collection of regions 1220 is displayed. Playing-time duration field 1280 permits setting a playing-time duration for regions assigned the lightest shade of gray by duration shading map 1240. Duration difference field 1270 permits setting a difference in playing-time duration of regions to which duration shading map 1240 assigns consecutive shades. In this instance, a playing-time duration of 3 seconds is set for regions to which duration shading map 1240 assigns the lightest shade. The difference in playing-time duration of regions to which duration shading map 1240 assigns consecutive shades is set at 1.7 seconds. Therefore, in this embodiment, regions having the lightest shade may play for 3 seconds, those having the next-lightest shade may play for 4.7 seconds, and so forth.

Figure 13:
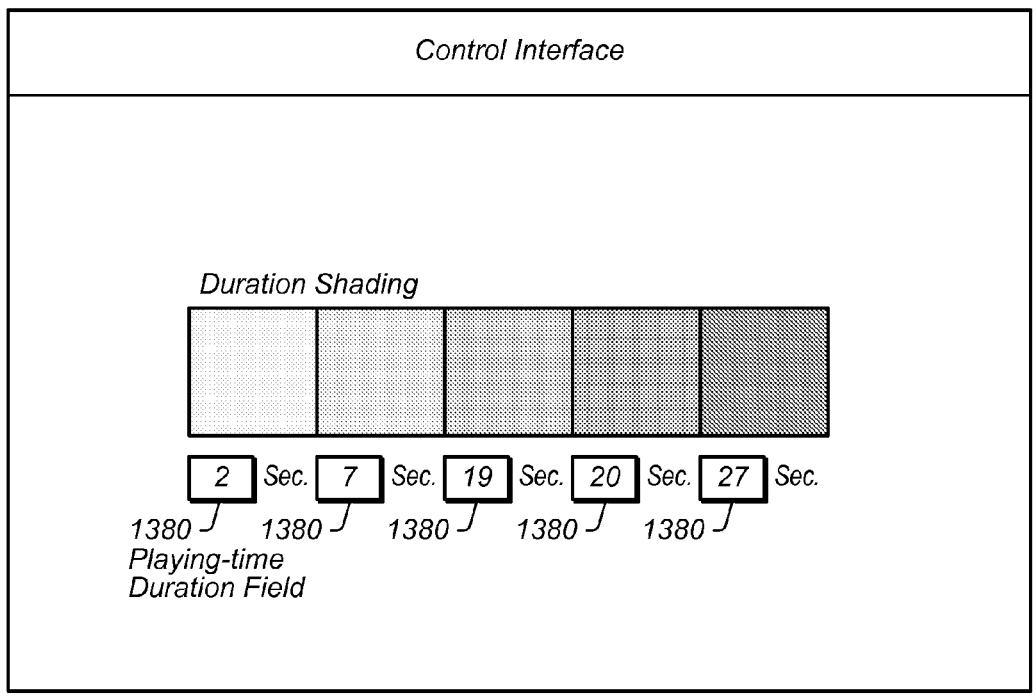
FIG. 13 depicts another embodiment of a control interface.

FIG. 13 shows an embodiment of another control interface for a duration shading map. In this example, shaded blocks representing shades used in the duration shading map are arranged consecutively in order of intensity. Playing-time duration fields 1380, one beneath each particular shaded block, permit setting how long to play, within each region of the viewing area to which the duration shading map assigns the shade of that particular block, an animation object assigned to that region by an animation object map. In this instance, each shade may be assigned a playing-time duration independently of the other shades. FIG. 13 depicts the lightest block set to indicate a playing-time duration of 2 seconds. The next-lightest block is set to indicate a playing-time duration of 7 seconds, and the remaining settings are for 19, 20, and 27 seconds.

FIGS. 14A through 14E form an interrelated illustrative collection of drawings for one particular embodiment of a system for playing animation objects within several regions of a viewing area, such that the playing is synchronized across the several regions.

FIG. 14A features an embodiment of an animation object used throughout FIGS. 14A-14E. In this embodiment, animation object 1435 is a video clip containing ten frames that appear successively at 1-second intervals. The first frame displays a large, dark circle, and the succeeding nine frames display circles of ever-diminishing size and intensity. The dark oval to the left of animation object 1435 is used to represent animation object 1435 in the animation object map shown in FIG. 14B.

Figure 14B:
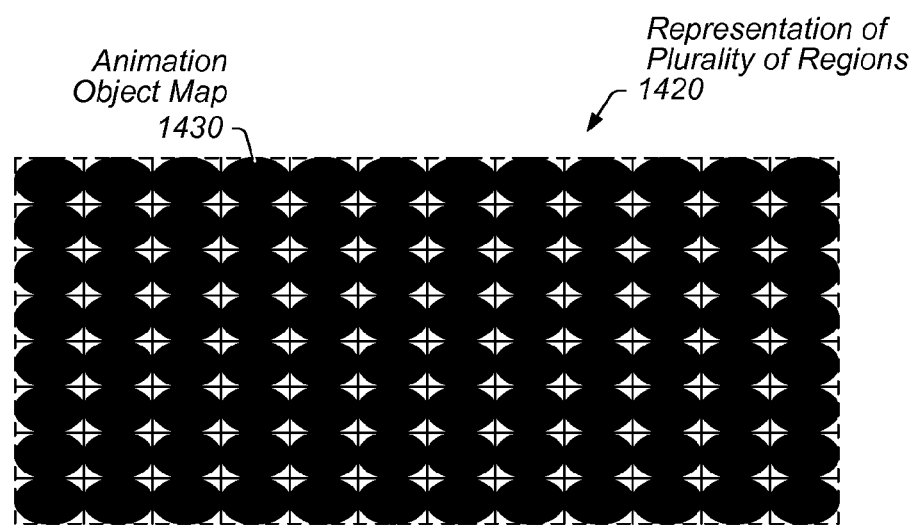
FIG. 14B shows an embodiment of an animation object map.

FIG. 14B shows an embodiment of an animation object map. In this embodiment, animation object map 1430 assigns animation object 1435, the video clip represented by the dark oval, to each region in the plurality of contiguous rectangular regions 1420 of viewing area 1410. The dark oval in the illustration represents the video clip shown in FIG. 14A. In this particular embodiment, all of the regions in the plurality of regions 1420 are assigned the same animation object 1435. In other embodiments, different animation object may be assigned to different regions in a plurality of regions of a viewing area.

Figure 14C:
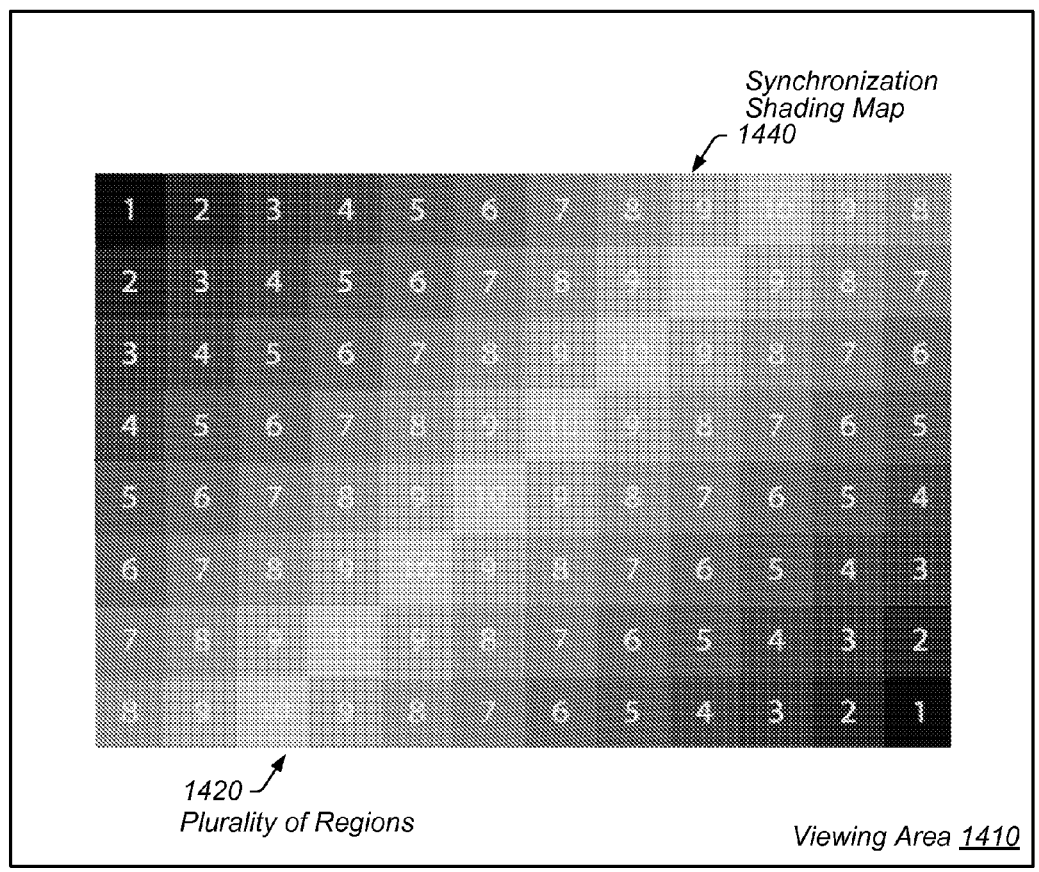
FIG. 14C shows an embodiment of a synchronization shading map.
Figure 14D:
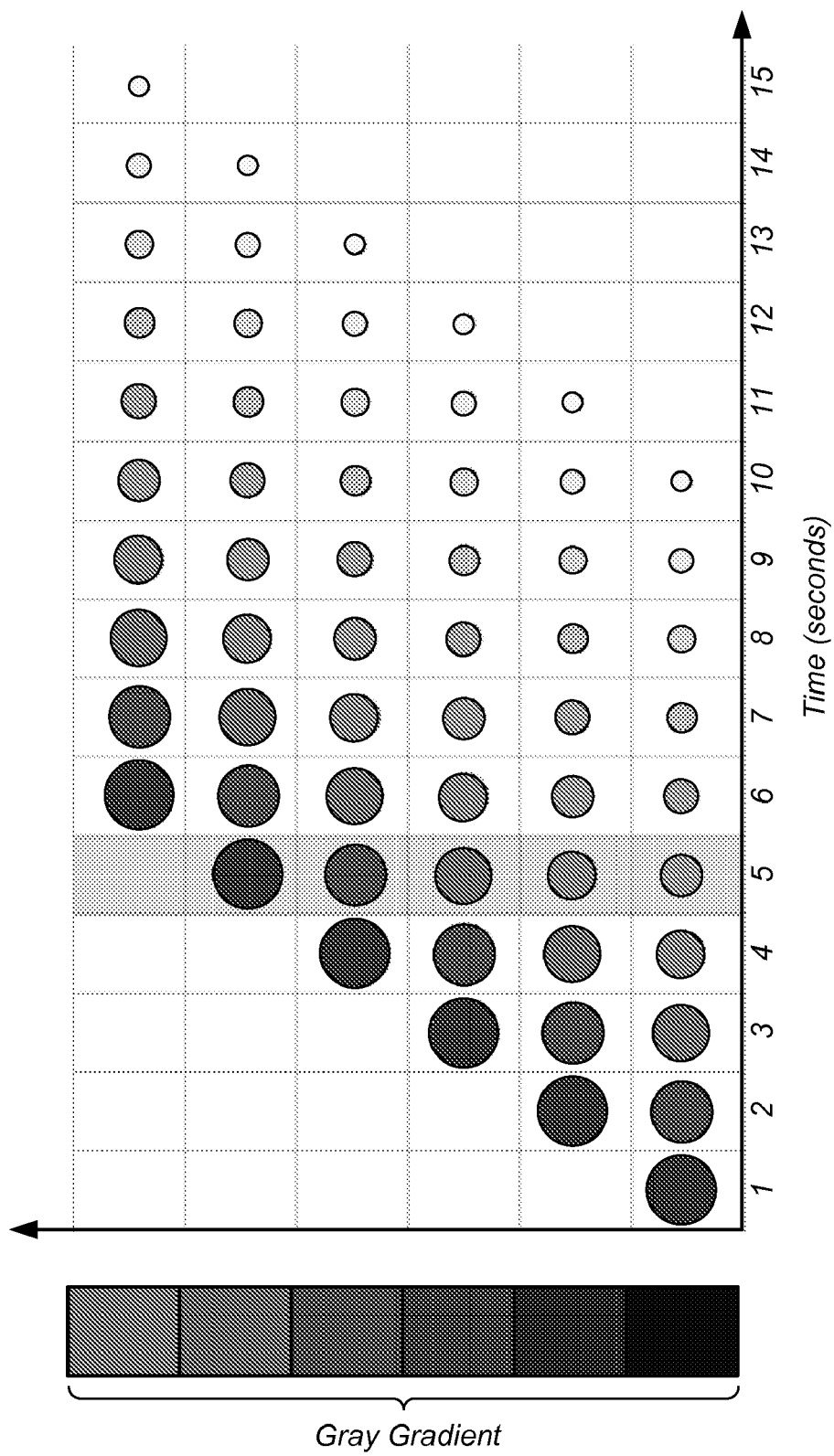
FIG. 14D presents a time-lapse collage of the video clip playing within the various regions of the grid shown in FIG. 14C.
Figure 14E:
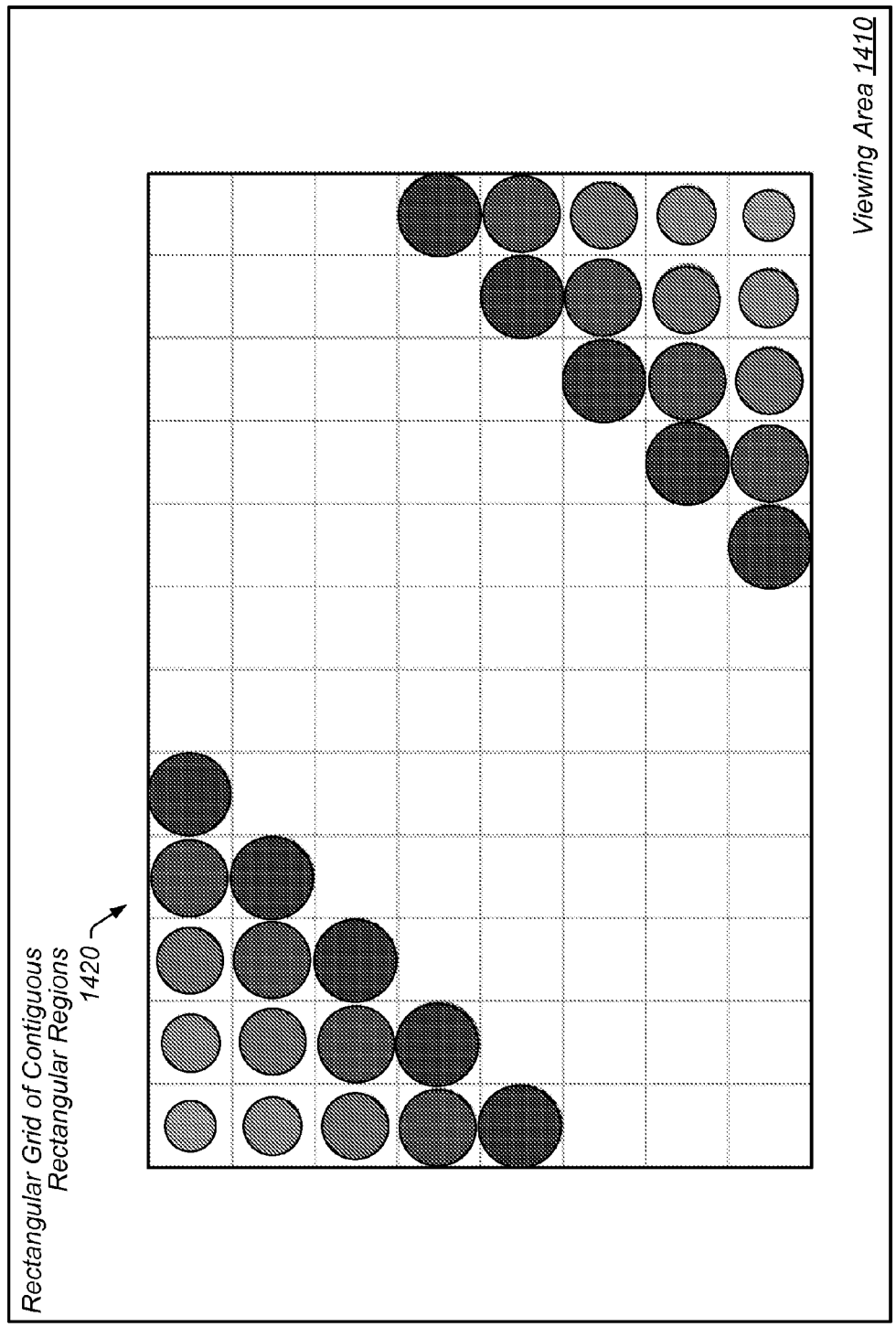
FIG. 14E offers a snapshot of the regions of the grid taken 5 seconds after the upper-left and lower-right regions began playing the video clip illustrated in FIG. 14A.

FIG. 14C pictures a synchronization shading map for the plurality of contiguous rectangular regions 1420 of viewing area 1410. Synchronization shading map 1440 assigns various shades of gray to the plurality of regions 1420 of viewing area 1410. In this instance, the plurality of regions 1420 are contiguous and form a grid. In other embodiments, various ones of the plurality of regions 1420 may be non-rectangular, or may be separated from each other, rather than contiguous, or may have irregular shapes. Each one of the plurality of rectangular regions 1420 is labeled with an integer that indicates the relative position of the start time for that region, in a sequential ordering of all the start times determined for the complete collection of regions 1420. The darker the region, the earlier its start time. For example, the two regions colored black, located in the upper-left and lower-right corners of the grid, are the ones that start playing video clip 1435 first, and each is labeled with the integer "1." The eight regions with the lightest shading, lying on a diagonal in the grid, are the ones that start playing video clip 1435 last, and each one is labeled with the integer "10." There are 10 shades of gray, and 10 start times corresponding to the 10 shades of gray.

FIG. 14D presents a time-lapse collage of video clip 1435 playing within the various regions of the grid of regions 1420 shown in FIG. 14C. In this illustration, each row exhibits a time-lapse sequence of video clip 1435 as it plays inside those regions whose shading matches the shade shown to the left of the row in the shade gradient column. The rows demonstrate the playing of video clip 1435 within the various regions relative to a common time axis. Since the bottom row matches the darkest shade in the shade gradient column, it shows the time-lapse sequence of video clip 1435 as the clip plays in the two darkest-shaded regions labeled with the integer "1" in FIG. 14C. The row adjacent to the bottom row matches the four regions labeled with the integer "2" in FIG. 14C. The third row from the bottom matches the regions labeled with the integer "3" in FIG. 14C, and so forth.

In FIG. 14D, the shaded column above the 5-second point on the time axis represents the appearance of the various regions 1420 during the $5^{th}$ second after playing commences in the two darkest-shaded regions. The bottom cell in the column shows the $5^{th}$ frame of video clip 1435, which is the frame displayed, during the $5^{th}$ second, within the regions labeled "1" in FIG. 14C. The next cell shows the 4$^{th}$ frame of video clip 1435, and so forth. The 6$^{th}$ cell in the column is blank, because, during the 5$^{th}$ second, playing has not yet begun within those regions whose shading matches the shade shown to the left of the 6$^{th}$ row in the shade gradient column, that is, within those regions labeled with the integer "6" in FIG. 14C.

FIG. 14E offers a snapshot of the regions 1420 of the grid taken 5 seconds after the upper-left and lower-right regions have begun playing the video clip 1435 illustrated in FIG. 14A. Comparing FIG. 14E with FIG. 14C reveals the correspondence between the start times for the various regions 1420 and the appearance, during the 5$^{th}$ second after playing begins in the earliest regions, of the entire rectangular grid of regions 1420.

FIG. 15 shows an embodiment in which a plurality of regions 1520 in viewing area 1510 are playing a variety of types of animation objects. During their playing, the illustrated animation objects variously represent particles in motion, fractal geometric patterns, pulsing light, twinkling stars, clouds in motion, falling snow, falling rain, people playing ball, a repeating pattern, and a moving bird whose singing is audible. Another region of the viewing is shown outside the rectangular grid, with a still image displayed within it. This region is separate from the plurality of regions 1520, and does not belong to plurality of regions 1520.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods for playing animation objects within several regions of a viewing area, such that the playing is synchronized across the several regions, as described above with respect to FIGS. 2-15. In particular, any of synchronization shading map module 500, animation object map module 510, playing module 520, and interface 530, or other suitable combinations or partitions of the functionality of these entities may be implemented as such instructions. Such instructions may be executed to perform a particular computational function, such as generating, sending, or receiving a message, to implement mathematical functions such as integration, differentiation, convolution, etc., as well as to implement higher-order functions such as operating system functionality, network communications functionality, application functionality, and/or any other suitable functions.

Figure 16:
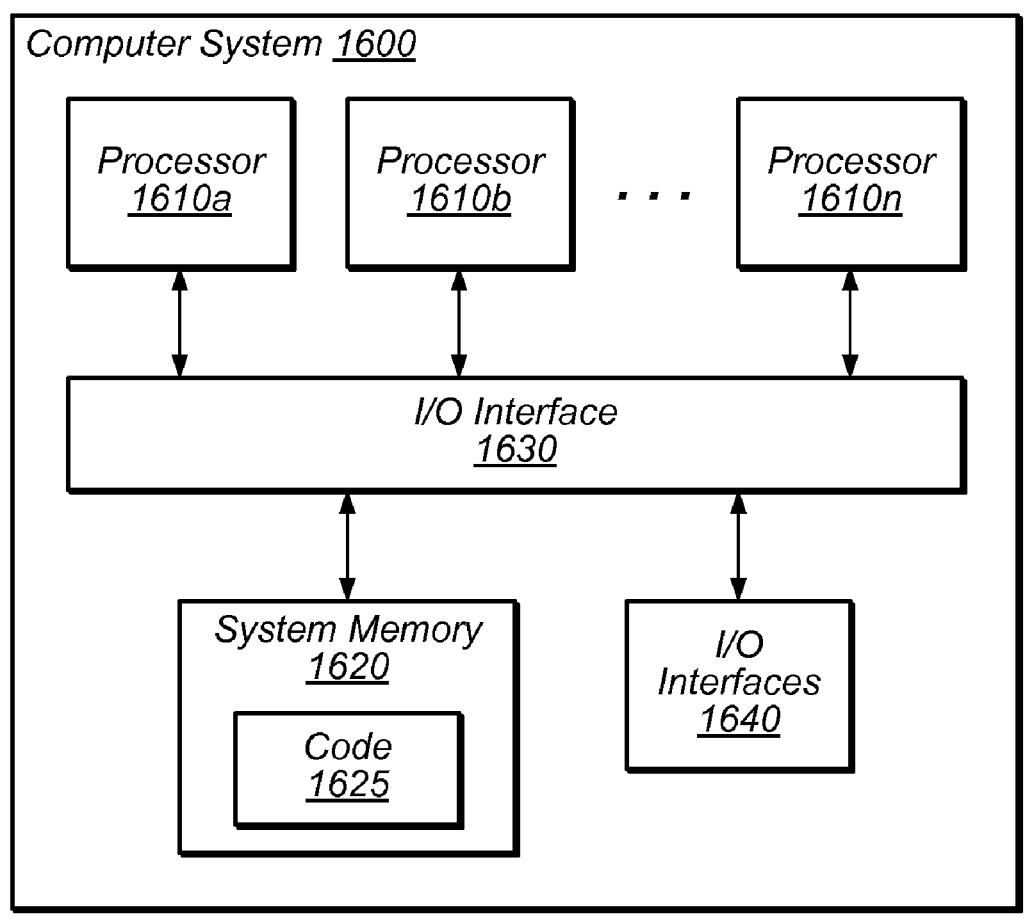
FIG. 16 is a block diagram illustrating an embodiment of a computer system.

One exemplary embodiment of a computer system including tangible, computer-accessible storage media is illustrated in FIG. 16. In the illustrated embodiment, computer system 1600 includes one or more processors 1610 coupled to a system memory 1620 via an input/output (I/O) interface 1630. Computer system 1600 further includes I/O interfaces 1640 coupled to external devices. In different embodiments, system 1600 may be variously configured as a server system, a desktop or notebook system, an embedded system, a handheld or portable client system, etc. In various embodiments, computer system 1600 may be representative of computer system 100 of FIG. 1 or of modules and interfaces illustrated in FIG. 5, including synchronization shading map module 500, animation object map module 510, playing module 520, and interface 530.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1610 may commonly, but not necessarily, implement the same ISA.

System memory 1620 may be configured to store instructions and data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1620 as code 1625. It is noted that in some embodiments, code 1625 may include instructions and data implementing desired functions that are not directly executable by processor 1610 but are represented or encoded in an abstract form that is translatable to instructions that are directly executable by processor 1610. For example, code 1625 may include instructions specified in an ISA that may be emulated by processor 1610, or by other code 1625 executable on processor 1610. Alternatively, code 1625 may include instructions, procedures or statements implemented in an abstract programming language that may be compiled or interpreted in the course of execution. As non-limiting examples, code 1625 may include code specified in a procedural or object-oriented programming language such as C or C++, a scripting language such as Perl or Ruby or Python, a markup language such as HTML or XML, or any other suitable language.

In one embodiment, I/O interface 1630 may be configured to coordinate I/O traffic between processor 1610, system memory 1620, and any peripheral devices in the device, including I/O interfaces 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

I/O interfaces 1640 may be configured to allow data to be exchanged between computer system 1600 and external devices, such as other computer systems or communications devices, for example. In particular, I/O interfaces 1640 may be configured to allow communication between computer system 1600 and various external devices. These external devices may include various computing and communications devices, which may include elements similar to those of computer system 1600. In particular, the external devices may include personal computers, telephony devices or network-attached computing devices that users may employ to access network services. Additionally, I/O interfaces 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 1600 via I/O interface 1630. A computer-accessible medium may also include any volatile or non-volatile media such as RAM (e.g. SDRAM, DDR SDRAM, RDRAM, SRAM, etc.), ROM, etc, that may be included in some embodiments of computer system 1600 as system memory 1620 or another type of memory. A computer-accessible medium may generally be accessible via transmission media or signals such as electrical, electromagnetic, or digital signals, which may be conveyed via a communication medium such as a network and/or a wireless link, such as may be accessed via I/O interfaces 1640.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
   performing, by a computer:
   receiving an animation object map that assigns an animation object to each region in a plurality of regions of a viewing area;
   receiving a synchronization shading map that assigns a shade to each region in the plurality of regions of the viewing area, wherein at least two of the shades assigned to regions in the plurality of regions differ in intensity;
   playing, within each region of the plurality of regions, the animation object assigned to the region by the animation object map, wherein the playing comprises:
   determining a start time for each of the regions in the plurality of regions, wherein the start time for each particular region depends upon an intensity of a shade assigned to the particular region by the synchronization shading map, and wherein ones of the plurality of regions having different shades differ in their respective start times based on a difference in intensities of shades assigned to those regions by the synchronization shading map; and
   for each region of the plurality of regions, starting playing within the region the animation object that is assigned to the region by the animation object map, wherein the playing of the animation object within the region begins at the start time determined for the region.

2. The method of claim 1, further comprising providing an interface for controlling:
   a maximum number of shades for use in the synchronization shading map; or
   a difference in start times indicated by consecutive shades used in the synchronization shading map, wherein consecutive shades are arranged in order of their intensity values.

3. The method of claim 1, wherein said playing further comprises determining, for each region in the plurality of regions, how long to play within the region an animation object assigned to the region by the animation object map.

4. The method of claim 3, wherein said determining how long to play is based on a duration shading map.

5. The method of claim 1, further comprising creating the synchronization shading map, wherein creating the synchronization shading map comprises:
   displaying a representation of the plurality of regions of the viewing area; and
   providing a painting tool configured to paint a visible shade onto each region of the representation.

6. The method of claim 1, further comprising providing an interface for selecting, from among a plurality of shades used in the synchronization shading map, one particular shade indicating an earliest of all start times determined for the plurality of regions.

7. The method of claim 1, wherein an animation object assigned by the animation object map comprises, during the time it is being played, one of the following: a representation of one or more particles which move or change; a representation of one or more objects which twinkle, pulse or blink; a representation of one or more fractal geometric patterns; a representation of one or more weather elements; video content; repetitive motion; 3D animation; or audible content.

8. The method of claim 1, further comprising, during the playing, displaying non-animated content within a region of the viewing area which does not belong to the plurality of regions of the viewing area.

9. The method of claim 1, wherein the animation object map assigns the same animation object to all the regions in the plurality of regions in the viewing area.

10. The method of claim 1, wherein the animation object map assigns a different one of at least two different animation objects to each of at least two different regions of the plurality of regions.

11. A system, comprising:
    a processor; and
    a memory coupled to the processor, wherein the memory stores program instructions executable by the processor to implement a playing module configured to perform:
    receiving an animation object map that assigns an animation object to each region in a plurality of regions of a viewing area;
    receiving a synchronization shading map that assigns a shade to each region in the plurality of regions of the viewing area, wherein at least two of the shades assigned to regions in the plurality of regions differ in intensity; and
    playing, within each region of the plurality of regions, the animation object assigned to the region by the animation object map, wherein the playing comprises:

determining a start time for each of the regions in the plurality of regions, wherein the start time for each particular region depends upon an intensity of a shade assigned to the particular region by the synchronization shading map, and wherein ones of the plurality of regions having different shades differ in their respective start times based on a difference in intensities of shades assigned to those regions by the synchronization shading map; and for each region of the plurality of regions, starting playing within the region the animation object that is assigned to the region by the animation object map, wherein the playing of the animation object within the region begins at the start time determined for the region.

12. The system of claim 11, wherein the program instructions are executable by the processor to provide an interface for controlling:
a maximum number of shades for use in the synchronization shading map; or
a difference in start times indicated by consecutive shades used in the synchronization shading map, wherein consecutive shades are arranged in order of their intensity values.

13. The system of claim 11, wherein the program instructions are executable by the processor to perform determining, for each region in the plurality of regions, how long to play within the region an animation object assigned to the region by the animation object map.

14. The system of claim 13 wherein the determining how long to play is based on a duration shading map.

15. The system of claim 11, wherein the program instructions are executable by the processor to perform creating the synchronization shading map, wherein creating the synchronization shading map comprises:
displaying a representation of the plurality of regions of the viewing area; and
providing a painting tool configured to paint a visible shade onto each region of the representation.

16. The system of claim 11, wherein the program instructions are executable by the processor to provide an interface for selecting, from among a plurality of shades used in the synchronization shading map, one particular shade indicating an earliest of all start times determined for the plurality of regions.

17. The system of claim 11, wherein an animation object assigned by the animation object map comprises, during the time it is being played, one of the following: a representation of one or more particles which move or change; a representation of one or more objects which twinkle, pulse or blink; a representation of one or more fractal geometric patterns; a representation of one or more weather elements; video content; repetitive motion; 3D animation; or audible content.

18. The system of claim 11, wherein the program instructions are executable by the processor to perform, during the playing, displaying non-animated content within a region of the viewing area which does not belong to the plurality of regions of the viewing area.

19. A computer-readable storage medium storing program instructions, wherein the program instructions are computer-executable to perform:

receiving an animation object map that assigns an animation object to each region in a plurality of regions of a viewing area;

receiving a synchronization shading map that assigns a shade to each region in the plurality of regions of the viewing area, wherein at least two of the shades assigned to regions in the plurality of regions differ in intensity; and playing, within each region of the plurality of regions, the animation object assigned to the region by the animation object map, wherein the playing comprises:
determining a start time for each of the regions in the plurality of regions, wherein the start time for each particular region depends upon an intensity of a shade assigned to the particular region by the synchronization shading map, and wherein ones of the plurality of regions having different shades differ in their respective start times based on a difference in intensities of shades assigned to those regions by the synchronization shading map; and for each region of the plurality of regions, starting playing within the region the animation object that is assigned to the region by the animation object map, wherein the playing of the animation object within the region begins at the start time determined for the region.

20. The computer-readable storage medium of claim 19, wherein the program instructions are executable by the processor to provide an interface for controlling:
a maximum number of shades for use in the synchronization shading map; or
a difference in start times indicated by consecutive shades used in the synchronization shading map, wherein consecutive shades are arranged in order of their intensity values.

21. The computer-readable storage medium of claim 19, wherein the program instructions are executable by the processor to perform determining, for each region in the plurality of regions, how long to play within the region an animation object assigned to the region by the animation object map.

22. The computer-readable storage medium of claim 21, wherein the determining how long to play is based on a duration shading map.

23. The computer-readable storage medium of claim 19, wherein the program instructions are executable by the processor to perform creating the synchronization shading map, wherein creating the synchronization shading map comprises:
displaying a representation of the plurality of regions of the viewing area; and
providing a painting tool configured to paint a visible shade onto each region of the representation.

24. The computer-readable storage medium of claim 19, wherein the animation object map assigns the same animation object to all the regions in the plurality of regions in the viewing area.

25. The computer-readable storage medium of claim 19, wherein the animation object map assigns a different one of at least two different animation objects to each of at least two different regions of the plurality of regions.

* * * * *